United States Patent [19]

Homanick

[11] 4,051,969

[45] Oct. 4, 1977

[54] BULK DISTRIBUTION SYSTEM

[75] Inventor: George Homanick, Lathrup Village, Mich.

[73] Assignee: PepsiCo Inc., Purchase, N.Y.

[21] Appl. No.: 667,156

[22] Filed: Mar. 15, 1976

[51] Int. Cl.² ............................................... B60P 1/64
[52] U.S. Cl. ..................................... 214/516; 104/48; 104/172 R
[58] Field of Search ..................... 214/83.36, 515, 516, 214/518; 104/48, 50, 172 R

[56] References Cited

U.S. PATENT DOCUMENTS

| 2,634,690 | 4/1953 | Clingan | 104/48 |
| 3,021,795 | 2/1962 | Hayba et al. | 104/48 |
| 3,204,797 | 9/1965 | Chandler | 214/518 |
| 3,749,268 | 7/1973 | Macomber et al. | 214/516 |

Primary Examiner—Robert G. Sheridan

Attorney, Agent, or Firm—Scully, Scott, Murphy & Presser

[57] ABSTRACT

A load carry arrangement with a storage and conveyance of load-carrying roller carts in a loading vehicle in which an endless conveyor is adapted to extend along the longitudinal platform of a cargo carrying vehicle. The arrangement includes a plurality of roller cart-supporting carriers fastened thereto which are adapted to be positioned on a cargo platform in predetermined spaced relationships, and which will facilitate the ready loading and unloading of cargo-carrying roller carts relative to the carriers while assuring the safe storage thereof in the cargo-carrying vehicle. No modification to the carriers or other containers are required, as they are emplaced directly onto the cart-carriers or slave pallets for transit. Space utilization within the truck or other vehicle is maximized with the present design, and the stability of the load emplacement permits ready, rapid cycling of goods within the truck, as in indexing for delivery.

16 Claims, 7 Drawing Figures

BULK DISTRIBUTION SYSTEM

This invention relates to the transportation of goods and to systems including methods and apparatus for the efficatious handling of cargo. More particularly, the invention concerns the vehicular transport of containerized cargo in a fully transpositional condition for ready access and presentment for delivery.

BACKGROUND OF THE INVENTION

The delivery of goods in bulk, through the utilization of containerized shipping and related systems of transport is now common practice. At the other end of the spectrum lies the retail delivery outlet of low volume, where a hand-held bakery basket may be sufficient.

Certain goods are characterized by such weight that even small orders require the use of some mechanical assistance for delivery of small to intermediate volume quantities of merchandise. Accordingly, specialized containerization practices have beeen adopted in many trades to afford a certain mechanical advantage to the operator-delivery person. Thus, for example a standard bulk carrier, (SBC) comprising a multishelved structure supported upon a castered base of dolly-like construction and surrounding on three upper sides by open metal mesh (being of standard weight and dimension) is in wide use by the beverage industry. Collections of bottles or cans, in six-packs or flat boxes are readily intermixed in a regular manner to provide the desired product mix for a given retail delivery, all disposed for that delivery in a single container. See 'Bulk distribution: the last frontier' Chvala, W. F. *Beverage Industry* (Nov. 7, 1975).

The drawbacks to this approach, especially where a single operator-delivery person is involved under curbside delivery conditions, reside in the relatively heavy weight of each piece of containerized cargo, in the case of beverages ranging up to about 1400 lbs. and the specificity of a given order interrelated with a given location. Transpositioning of these containers manually to key or index same in a satisfactory manner is physically difficult to impossible at best, and prohibitive in labor cost especially in the event of a missed delivery.

It is accordingly desirable to provide a mechanically energizable system for transpositioning cargo within a vehicle, and such systems have been developed, as disclosed in any of U.S. Pat. Nos. 3,204,797; 3,559,831; 3,724,698; 3,749,268; 3,381,794 or 3,877,596.

Unfortunately, these designs are in part inefficient in utilizing an excessive amount of floor space, or require revision or adaptation in existing container structures e.g. SBC which is impractical for the intended use and/or contraindicated from a captial usage point of view.

For example, the system described in U.S. Pat. No. 3,831,794 does not take adequately into account the substantial investment in container structures such as SBC, the regularization of dimensions and practices to the usage thereof, or the restriction of truck dimensions in many including the U.S. where a 96 inch widthwise dimension is enforced.

It is impractical and unsafe with this system to contemplate the use of the SBC devices coupled to a chain drive since the drive connectors in this design would extend beyond the base, capable of accidental engagement with structures and persons. The practical expense of providing the interconnections to the estimated 40,000 to 50,000 standard bulk carriers in use is also a consideration.

The carrier dimensions represented by the 27 × 42 inches of SBC, even allowing for maximum loading efficiency constitute a substantial percentage alone of the truck dimension, considering turning radius and indexed presentation in endwise confrontation from a rear or side elevator.

Then, the substantial weights involved militate against any prospect of a carrier system where such weight is supported in significant part by the chain, particularly where the carrier end must be elevated manually for engagement thereof to the drive mechanism.

Accordingly, it is the primary object of the present invention to provide a load carry arrangement with a storage and conveyance of load-carrying roller carts in a loading vehicle in which an endless conveyor is adapted to extend along the longitudinal platform of a cargo carrying vehicle, and it includes a plurality of roller cart-supporting carriers fastened thereto which are adapted to be positioned on a cargo platform in predetermined spaced relationships.

Another object of the present invention is to provide a load conveyor arrangement of the above-mentioned type which will facilitate the ready loading and unloading of cargo-carrying roller carts relative to the carriers while assuring the safe storage thereof in the cargo-carrying vehicle.

A further object of the present invention is to provide load conveyor arrangements of the above-mentioned type which will facilitate the rapid loading and unloading of cargo carried on roller carts and the predetermined positioning of the cargo in the vehicle during storage and transportation of the cargo.

In accordance with the invention a design for transport and delivery of goods utilizing existing containers is afforded, as in the handling of beverages with standard bulk carriers. No modification to the carriers or other containers are required, as they are emplaced directly onto the cart-carriers or slave pallets for transit. Space utilization within the truck or other vehicle is maximized with the present design, and the stability of the load emplacement permits ready, rapid cycling of goods within the truck, as in indexing for delivery.

Further details and advantages of the invention may now be ascertained from the following detailed description of an exemplary embodiment thereof, taken in conjunction with the accompanying drawings; in which:

FIG. 4 is a sectional view showing the connection of the cart carrier to the load conveyor;

DETAILED DESCRIPTION OF THE INVENTION

Figure 1:
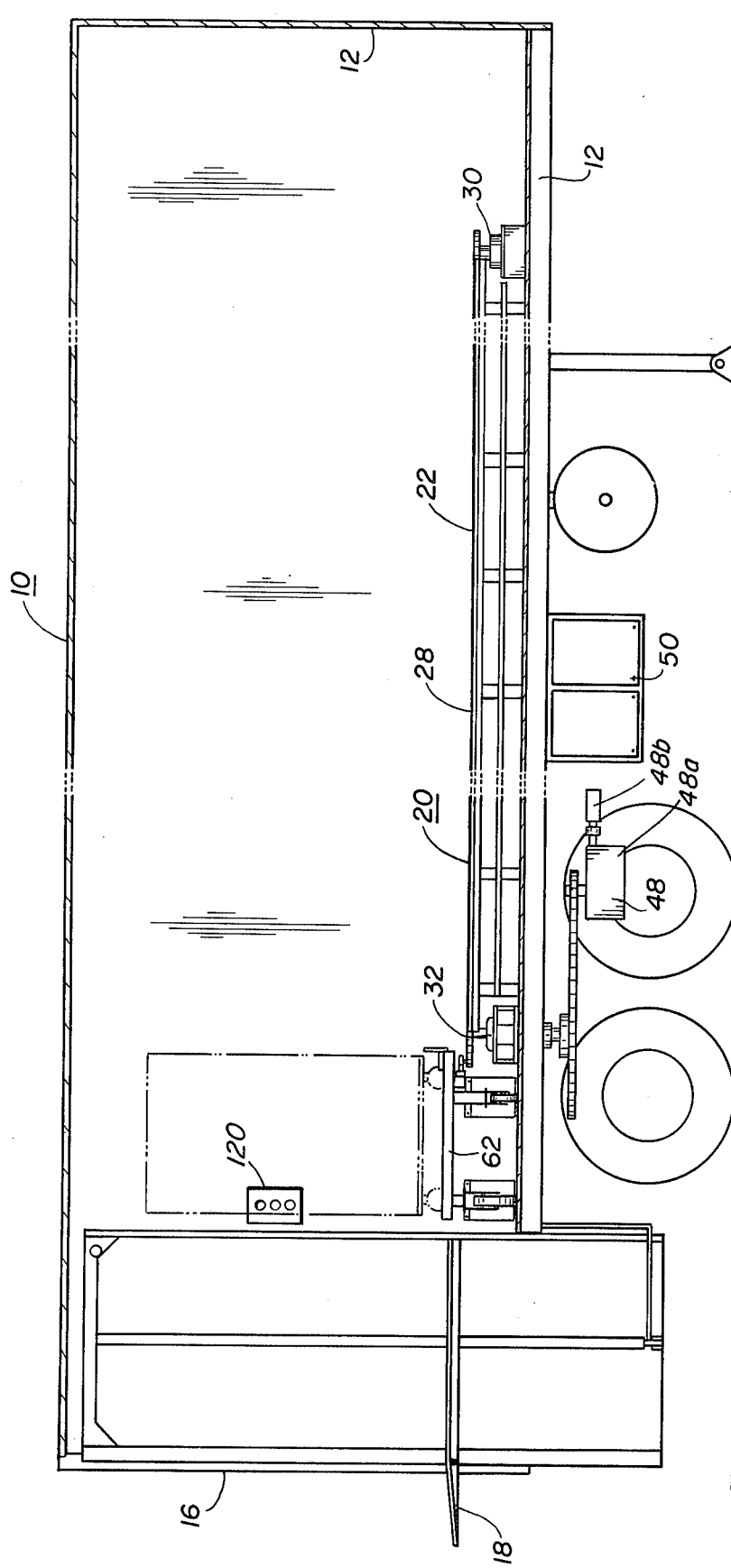
FIG. 1 shows an elevational sectional view through the cargo-carrying vehicle incorporating a load carrier arrangement pursuant to the present invention.
Figure 2:
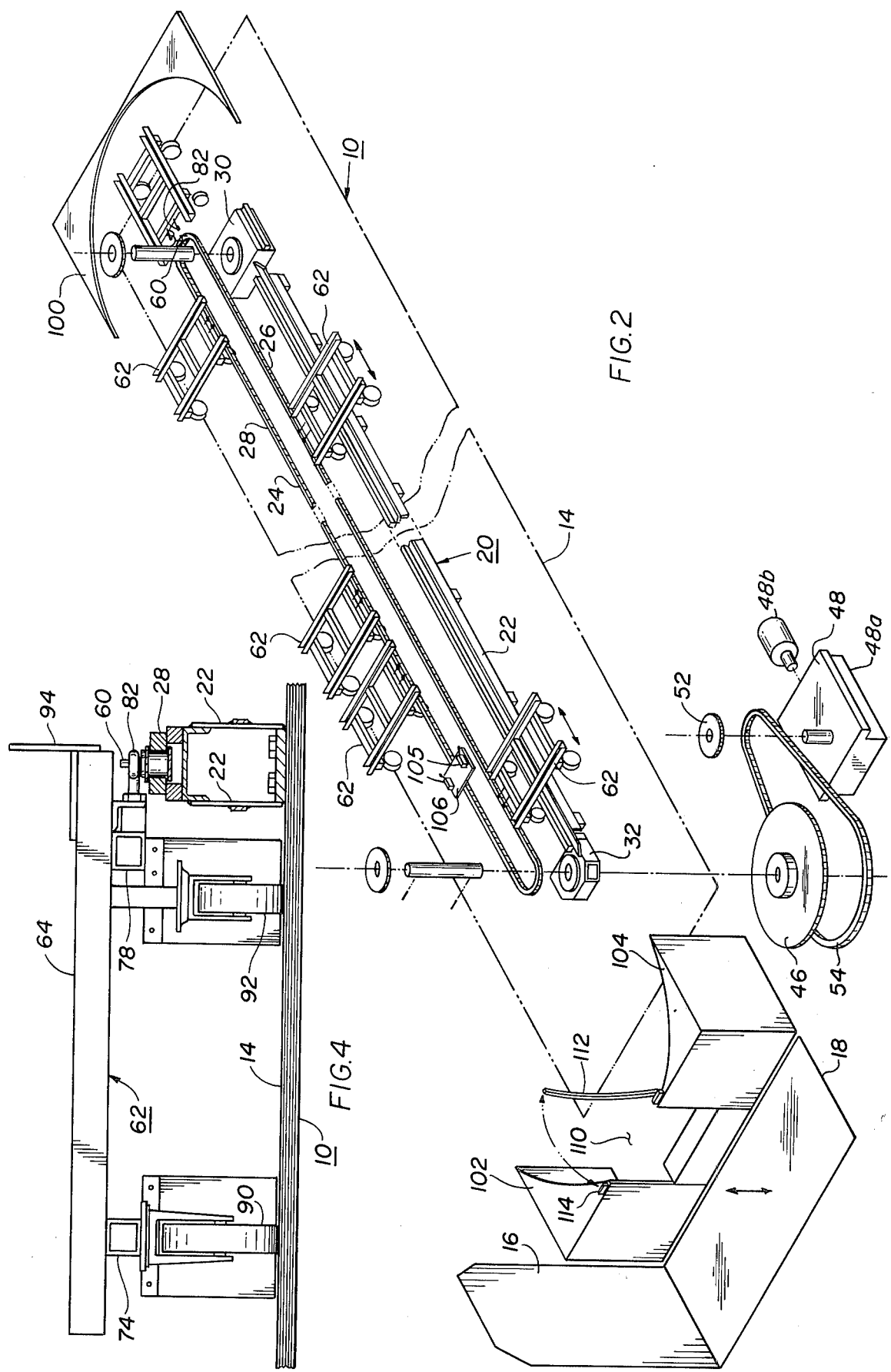
FIG. 2 is a perspective exploded view illustrating the load-carrying platform of the cargo vehicle and showing essential details of the load conveyor arrangement.

Referring now in detail to FIGS. 1 and 2 of the drawings, a cargo-carrying vehicle 10 may consist of the truck trailer which is adapted to be connected to a standard driving cab (not shown). The truck trailer has standard upstanding wall portions of which the front end wall 12 projects from a base or load carrying platform 14. Fastened to the rear of the truck trailer 10 is a hydraulic elevator arrangement 16 of well-known structure having a vertically movable platform or hoist 18 connected thereto, and which is adapted to be lowered to a position close to the ground, or, alternatively, raised to a level above the loading platform of truck body 10. The foregoing structural components of the trailer truck 10 are primarily standard features and components and need not be further described herein except with reference to their operative relationship to the present inventive load conveyor arrangement.

Mounted on the cargo platform 14 so as to extend longitudinally and centrally thereof is a load conveyor arrangement 20. The load arrangement 20 includes a pair of parallel spaced conveyor chain guides 22, of which one is shown in FIG. 2, above which there extend the runs 24 and 26 of an endless conveyor chain 28. The opposite ends of the conveyor chain 28 are entrained about, respectively, a takeup bracket unit 30 and a drive unit 32, the latter of which is described in greater detail hereinbelow. The chain guide 22 is bolted or otherwise suitably fastened to the horizontal cargo platform 14 of the trailer truck 10.

Figure 3:
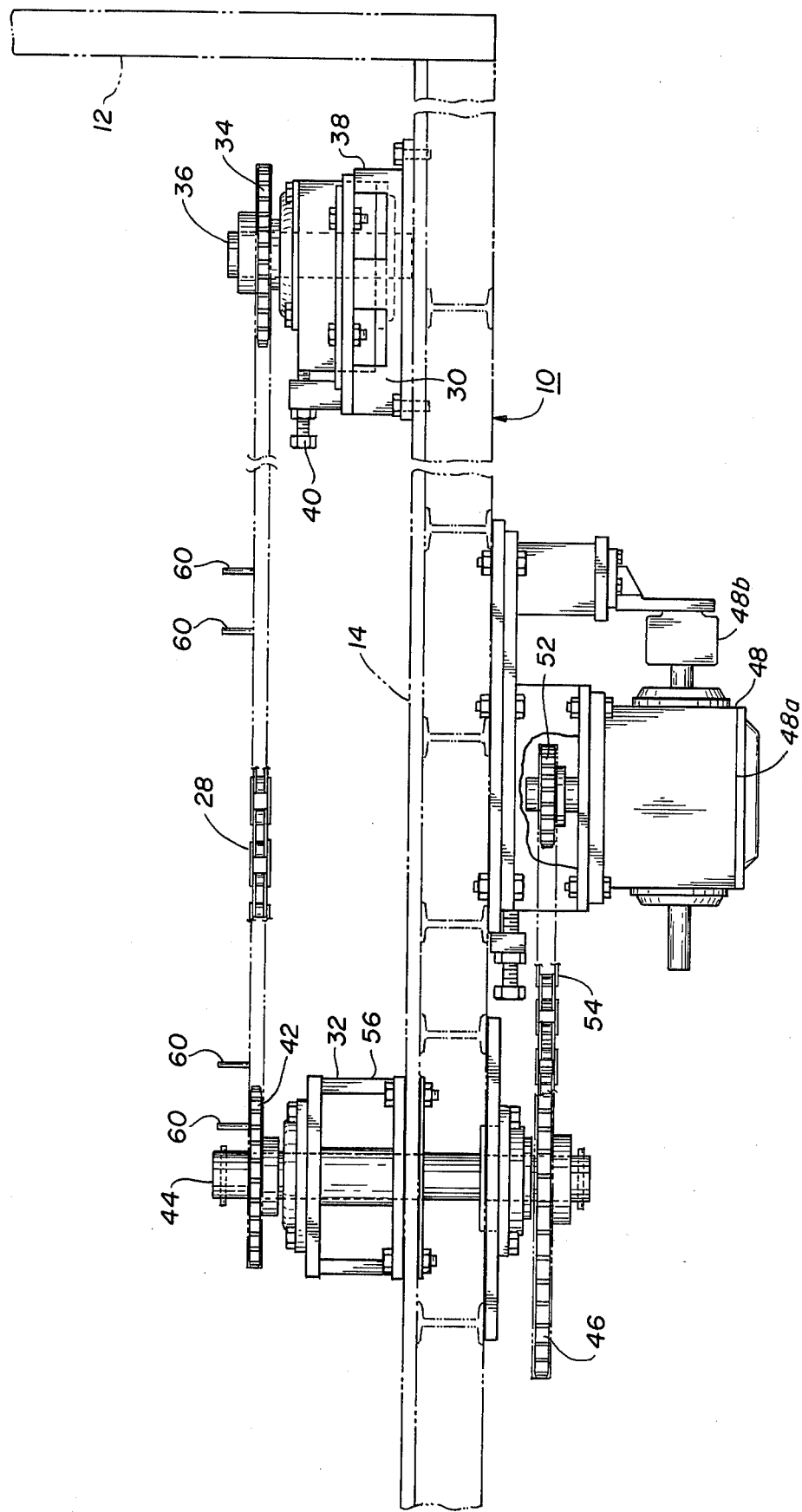
FIG. 3 is an enlarged sectional view of the drive unit for the load conveyor arrangement.

As shown in detail in FIG. 3 of the drawings, one end of the endless conveyor chain 28 is entrained about a pulley 34 forming a part of the takeup bracket unit 30. The bracket unit 30 may be positioned and mounted on the platform 14 approximate the front inside wall 12 of the trailer body. The sprocket wheel 34 is rotatably mounted on a vertical shaft 36 which is journalled in the bracket support structure 38. Suitable bolt adjusting means 40 may be provided for imparting longitudinal movement to the upper portion of the bracket support member 38 so as to allow for bearing axial tension on the sprocket chain 28 during operation thereof.

At the opposite end of the trailer body 10, there is mounted on the platform 14, the drive unit 32 which, similarly to takeup bracket 30, includes a sprocket wheel 42 about which the opposite end of endless sprocket chain 28 is entrained. The sprocket wheel 42 is mounted on a vertically extending rotatable shaft 44 which projects downwardly through the platform 14, and which has another sprocket wheel 46 mounted below the trailer body 10 approximate its lower end. Mounted on the bottom of the trailer body 10 is a power drive unit 48 which may be powered by a suitable electrical energizer, such as a 24 volt power pack 50, shown in FIG. 1 of the drawings. The power drive unit 48 may be constituted of an electrically-operated motor 48a, generally operating in a unidirectional mode, and which may be operatively connected to a reversible hydraulic motor 48b for driving the endless conveyor chain 28 in opposite directions, as desired. A rotatable sprocket wheel 52 forming part of the drive 48 is interconnected with the sprocket wheel of 46 by means of a sprocket chain 54 so as to impart a rotation to the wheel of 46 and, resultingly, to the endless sprocket chain 28 through intermediary sprocket wheel 42. Suitable bracket structure 56 is mounted on the platform 14 so as to provide support for the shaft of 44 and sprocket wheel of 42. In the preferred embodiment, the sprocket comprises 26 teeth, and while sprockets of 5 or 6 inch up to 14 inch diameters may be used, it will be understood that smaller sprockets will provide fewer teeth and less torque, hence sprocket dimension will be generally matched to the load.

Mounted on the endless chain 28 are a plurality of pairs of upstanding pin members 60 which extend along the length of the endless sprocket conveyor chain at predetermined spaced distances.

Figure 5:
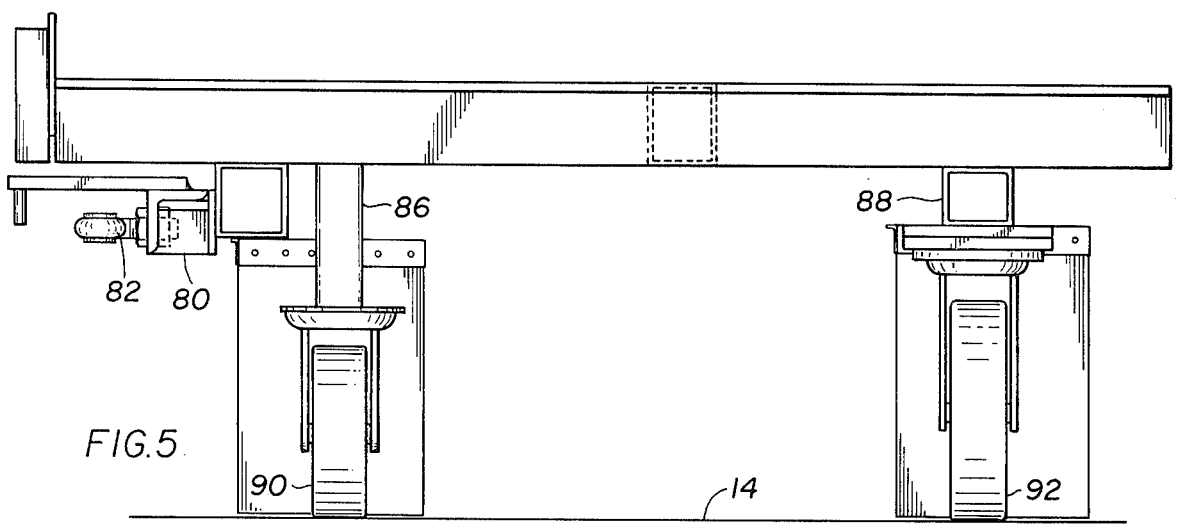
FIG. 5 is a side elevational view of the load carrier of FIG. 4.
Figure 6:
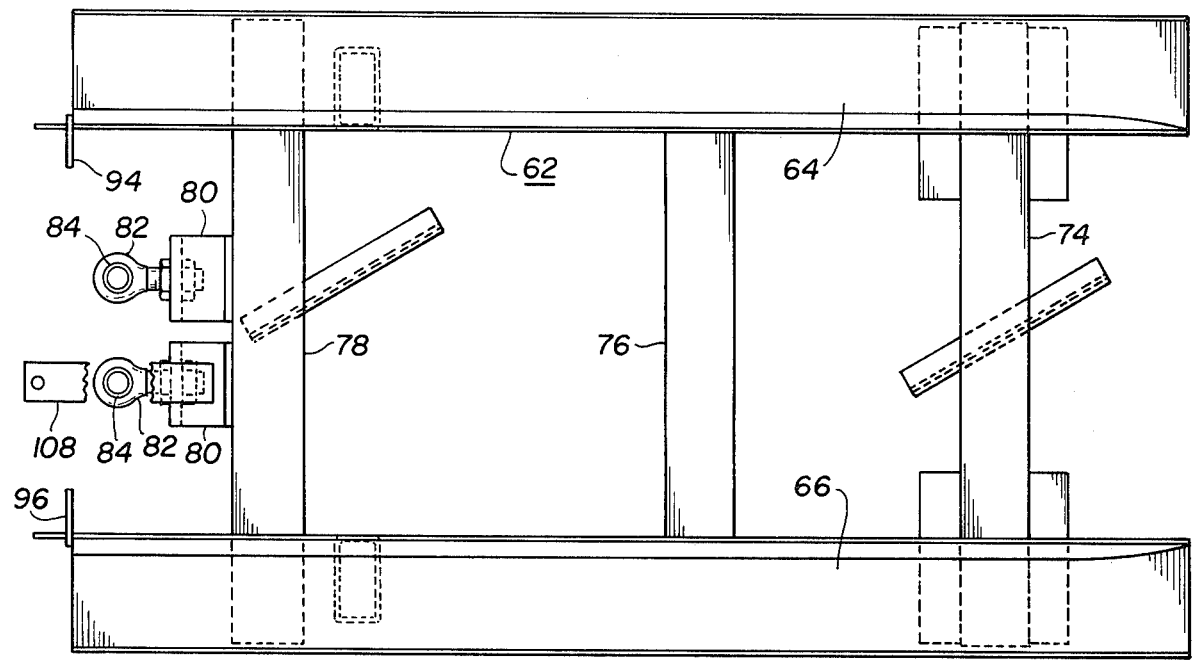
FIG. 6 is a top plane view of the cart carrier.
Figure 7:
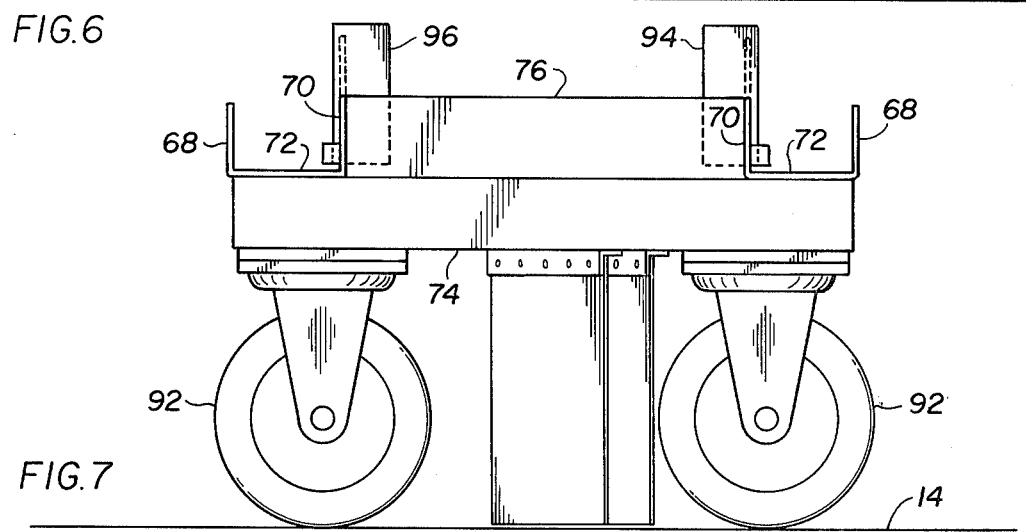
FIG. 7 is an end view of the cart carrier.

Connected to, respectively, each pair of upstanding pins 60 is a cart carrier 62, as shown in the FIGS. 1 and 4 of the drawings. Structural details of the cart carrier 62 are described hereinbelow with reference to FIGS. 5 through 7 of the drawings. The pins 60 are ordinarily spaced apart about 3 inches for a No. 100 chain, 1¼ pitch, and a suitably arced pivot at the turns. Shear pins are preferably employed, which will permit disengagement of the slave pallets in the event of excessive stress. For loads of 1000–1500 pounds, as with beverage loaded SBC units, the pins are adapted to carry about 130 lb. The pins of the most preferred embodiment are of 3¾ inch length and are dimensioned to a press fit within the chain link.

The provision of pairs of pins for engagement with the cart carriers is a special feature of the present invention, in that the carriers may by this expedient be reversibly driven by the chain in a controlled and stable manner. Thus, in a delivery sequence, a standard bulk carrier may be indexed to the elevator by the shortest path, usually less than a half cycle.

Each cart carrier 62 includes a pair of parallel spaced generally horizontal beams 64 and 66. Each of the beams is of generally U-shaped cross-sectional configuration having upstanding flanges 68 and 70 and a bottom web 72 forming a support platform for the casters of load-carrying carts. The beams 64 and 66 are interconnected by cross-beams 74, 76 and 78 passing therebelow and between so as to form a rigid cage structure. Mounted on cross-beam 78 and fastened thereto through suitable welding, brazing or bolting, are a pair of brackets 80 which each support an eye bolt 82 having a grommet 84 located in the eye thereof. The pins 60 on the endless sprocket chain 28 are adapted to pairwise extend vertically upwardly through the pairs of grommets 84 of each of the carriers 62 so as to cause the carriers to be hooked to the endless sprocket chain 28. Pending from the bottom of the carrier 62 are support members 86 and 88 each, respectively, supporting a pair of casters 90 and 92 which are adapted to roll on the cargo platform 14 of the trailer truck body 10. Each of the casters is load bearing in use, and is typically about 5–6 inch diameter to raise the carrier well above the floor to avoid debris such as broken bottles. To ensure freedom from interference with the casters, each may also be fitted with a guard to shunt aside debris.

Fastened to the end of each of the beams 64 and 66 approximate to the eye bolts 82 are a pair of upstanding plate members 94 and 96 which are adapted to engage the rear wall of a cargo-supporting cart which is located on the carrier 62 and to prevent the cart from rolling off the carrier at the end.

As shown in FIG. 2 of the drawings, the carts extend normally from the parallel runs 24 and 26 of the endless sprocket conveyor chains 28, to which the carriers 62 are attached by means of the pairs of pins 60.

The interior of the trailer body 10 may include further guide members 100 at the front end thereof and guide members 102 and 104 at the rear end thereof. Between the guide members 102 and 104 there may be provided an opening 110 through which the cargo-supporting carts may be loaded onto or unloaded from the carriers 62 when the elevator 8 is in a raised position, as shown in FIG. 1 of the drawings.

In order to provide for the precise positioning of the carriers 62 on the platform 14 during loading, unloading and conveyance of the cargo-carrying carts which are supported on the carrier 62, a suitable limit switch structure 105 and circuitry 106 may be provided, which is engageable and actuatable by projecting bracket members 108 mounted on the carriers 62.

In order to prevent the rolling off of the cargo-carrying carts from the support surfaces 72 of the carriers 70 during storage and transportation in the vehicle, the casters 90 and 92 may be so dimensioned relative to each other as to impart an inclination or scope to the horizontal beams 64 and 66 of carrier 62, inclined downwardly at an angle at about 3° towards the end connected to the sprocket chain 28. This will cause any roller cart supported on the carrier 62 to roll into engagement with stops 94 and 96 and to so remain in contact therewith until off-loaded from the carrier 62. Of course, the casters may be of the same dimension, and the beams inclined directly.

The function of the load conveyor arrangement is essentially as follows:

An operator wishing to load the cargo supported on a roller cart in the trailer truck body 10 will, initially, open the rear doors of the truck body 10 and roll the roller cart e.g. SBC on to the elevator 18. Thereafter, the operator will cause the elevator 18 to be raised until substantially at the elevation of support surface 72 of the carrier 62, as shown in FIG. 1, which is in alignment with the door 110 between guides 102 and 104. Thereafter, the operator will push the roller cart onto the carrier 62 until the end wall of the roller cart contacts stops 94 and 96. The inclination of the carrier 62 towards the center of the platform or endless conveyor sprocket chain 28 will cause the roller cart to remain in contact with the stops 94 and 96 and prevent the roller cart from inadvertent movement during the motion of the cargo vehicle.

Subsequently, the operator will actuate a control 120, preferably consisting of a control panel incorporating manually-actuatable push-buttons, and electrically interconnected with the motor unit 48 and elements 105 and 106, which may be conveniently mounted on the side rear inside wall of the trailer truck body 10, thereby causing the drive unit 32 to move the endless sprocket conveyor chain 28 and thereby roll the loaded carrier 62 towards the front end of the trailer truck body. A suitable electrical indexing system may be provided in conjunction with the limit switch structure 105 and circuitry 106 in order to provide for a predetermined positioning of the loaded carrier 62 within the truck body. Thereafter, the elevator platform 18 may be lowered and the process repeated for further loading of subsequent carriers with cargo-supporting roller carts. The same procedure may be followed for off-loading of the various carriers 62, suitable electrical indexing means being provided with the controls for assuring the correct positioning of the respective carriers in alignment with the doorway or opening 110. Such encoded indexing will permit an operator to practically instantaneously select the correct appropriate carrier containing the desired cargo for either loading or off-loading. Additionally, this will allow the operator to make a delivery of a cargo or load supported on any particular carrier 62 while a subsequent carrier 62 is moved to either a loading or off-loading position.

In order to prevent any inadvertent falling off of a loaded roller cart from the rear of the cargo-carrying vehicle, it is possible to provide suitable indexing circuitry in conjunction with the limit switch arrangement 106 so as to prevent motion of the vehicle when a carrier 62 is positioned in alignment with the rear opening 110 or at an angular relationship facing towards the guides 102 and 104. Furthermore, suitable safety interlock means 112 may be provided which will also prevent motion of the vehicle unless down into locking engagement with a contact 114.

In order to prevent the carrier 62 from swaying sideways relative to the runs 22 and 24 of the endless conveyor sprocket chain 28, the dual pin arrangement 60 will assure that the carrier 62 always extends normally to the conveyor runs and that the carriers will swing about the curved ends of the conveyor without tilting sideways relative thereto. This and other features permit the carts to be closely spaced, suitably as little as 3 inches between carts being operable.

The stability of the system permits cycling of a whole load comprising 27 carts within 3 minutes, i.e. carts may be indexed to the doorway engaging position from the next adjacent position in 7 seconds.

A feature of the invention embodied in the construction detail involves the maximum utilization of available space under conditions for stable rapid cycling of fully loaded carts. The cart carriers are pivoted for rotation in the turns about a point as far outboard i.e. toward the truck center as possible. Prior systems providing inboard pivots on carts require recessed casters for chain clearance and this reduces stability for heavy loads. Further, in these prior systems at equivalently arced runs through the turns, large sprocket dimensions are required whereas the recessed casters prevent the load from being cantilevered over the chain run.

In the present arrangement, outboard pivoting permits a full arc of turn with fully spaced casters maximizing load stability and permitting cantilevering across a portion of the chain run. In practice, despite the heavy loads involved with beverage loaded SBC, the carts may be placed some 6 to 8 inches beyond the caster and over the chain by a distance delimited primarily by their 72 inch height and the 3° tilt for clearance of the topmost portions.

For ease of description the present invention has been principally described relative to a truck for beverage delivery utilizing standard bulk carriers; however, it is understood that the bulk distribution system described has applicability generally to cargo handling in vessels of lading of all types, including trains, aircraft, merchant ships and the like; cargo of all kind and nature, including mail and comestibles; and delivery and pickup operations generally, as for franchise systems, etc.

What is claimed is:

1. A load conveyor arrangement for the storage and conveyance of load-carrying roller carts in a loading vehicle having a loading platform, comprising: endless conveyor means having a pair of conveyor runs extending along the longitudinal length of said platform; a plurality of roller cart-supporting carriers being fastened to said endless conveyor means in predetermined spaced relationship along the length thereof, each of said carriers being adapted to respectively support one of said roller carts, each said carrier comprising a pair of parrallel spaced U-rails extending normally from said endless conveyor means above said loading platform, said U-rails being downwardly inclined towards said endless conveyor means, and at least one crossbeam interconnecting said U-rails so as to form a rigid bracket structure, said load-carrying roller carts each having casters mounted thereon adapted to be supported on said U-rails; drive means operatively engaging said endless conveyor means for moving said conveyor runs and said carriers along said platform; and means for controlling the extent of movement of said endless carrier means and of said carriers for selectively positioning said carriers on said loading platform in either roller cart loading and unloading or transportation modes.

2. An arrangement as claimed in claim 1, said endless conveyor means having the conveyor runs extending near the central longitudinal axis of said loading platform in closely spaced parallel relationship, said carriers each having one end fastened to said endless conveyor means so as to extend normally from said conveyor runs towards opposite sides of said loading platform; and wheel means being mounted on said carriers for facilitating rolling of the latter on said loading platform in response to movement of said endless conveyor means.

3. An arrangement as claimed in claim 2, comprising pairs of pin mounts fastening each said carrier to said endless conveyor means, each said pair of pin mounts being spaced along said endless conveyor means.

4. An arrangement as claimed in claim 5, said U-rails being inclined at an angle of about 3°.

5. An arrangement as claimed in claim 1, comprising stop means on said U-rails for limiting movement of said roller carts towards the center of said loading platform.

6. An arrangement as claimed in claim 1, said endless conveyor means comprising a sprocket chain, said drive means including sprocket wheels proximate the opposite ends of said loading platform, said sprocket chain being entrained about said sprocket wheel to form said conveyor runs; and motor means connected to at least one of said sprocket wheels for driving said sprocket chain.

7. An arrangement as claimed in claim 6, said motor means comprising an electrically-operated motor.

8. An arrangement as claimed in claim 6, said motor means comprising a uni-directional electric motor and a reversible hydraulic motor for driving said endless conveyor means in opposite directions.

9. An arrangement as claimed in claim 7, comprising electrical power supply means being mounted on said vehicle for supplying electrical energy to said motor.

10. An arrangement as claimed in claim 9, said electrical power supply means comprising a storage battery.

11. An arrangement as claimed in claim 1, comprising limit switch means operatively connected to said drive means for positioning said carriers at predetermined locations on said loading platform responsive to being actuated by a predetermined one of said carriers.

12. An arrangement as claimed in claim 1, comprising contol means connected to said drive means for determining the extent of movement of said endless conveyor means and locating said carriers in predetermined locations on said loading platform.

13. An arrangement as claimed in claim 1, comprising safety interlock means on said loading platform actuatable to restrain said endless conveyor means from inadvertent movement during predetermined intervals in the storage and conveyance of said roller carts on said carriers.

14. A system for the handling of containerized cargo comprising a load platform, said platform being transected by driven endless elongated conveyor means, a multiplicity of load carriers slaved to said conveyor means at closely spaced intervals, said load carriers being elevated above said platform and adapted for movement thereacross by provision of wheel means, said wheel means comprising a plurality of fully spaced wheels, each of said wheels being load bearing, the load carriers respectively being slaved to said conveyor means from positions proximate the periphery of the load carriers whereby the load carriers extend normally from said conveyor means and pivot through a maximum arc about the termini of said conveyor means, each said load carrier comprising a pair of parallel spaced U-rails extending normally from said endless conveyor means above said loading platform, said U-rails being downwardly inclined towards said endless conveyor means, and at least one crossbeam interconnecting said U-rails so as to form a rigid bracket structure, said load-carrying roller carts each having casters mounted thereon adapted to be supported on said U-rails; drive means operatively engaging said endless conveyor means for moving said conveyor runs and said carriers along said platform; and means for controlling the extent of movement of said endless carrier means and of said carriers for selectively positioning said carriers on said loading platform in either roller cart loading and unloading or transportation modes.

15. The bulk distribution system of claim 14, said endless conveyor means comprising a chain engaged about a pair of opposed spaced sprocket wheels, said sprocket wheels having a diameter of up to about 8 inches, at least a pair of said wheels being located adjacent the chain, and the load carrrier extending across a portion of the chain run.

16. The bulk distribution system of claim 15, wherein said load carriers are slaved to said conveyor means through pairs of closely spaced shear pins.

* * * * *